(12) United States Patent
Kageyama

(10) Patent No.: US 10,462,360 B2
(45) Date of Patent: Oct. 29, 2019

(54) IMAGE CAPTURING APPARATUS AND CONTROL METHOD UTILIZING AN IMAGE SENSOR WITH TWO-DIMENSIONAL PIXELS AND PIXEL SIGNAL STORING UNIT

(71) Applicant: CANON KABUSHIKI KAISHA, Tokyo (JP)

(72) Inventor: Takashi Kageyama, Yokosuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 38 days.

(21) Appl. No.: 15/589,318

(22) Filed: May 8, 2017

(65) Prior Publication Data

US 2017/0332013 A1 Nov. 16, 2017

(30) Foreign Application Priority Data

May 12, 2016 (JP) ................................ 2016-096362

(51) Int. Cl.
| | |
|---|---|
| *H04N 5/228* | (2006.01) |
| *H04N 5/232* | (2006.01) |
| *H04N 5/378* | (2011.01) |
| *H04N 5/77* | (2006.01) |

(52) U.S. Cl.
CPC ......... *H04N 5/23229* (2013.01); *H04N 5/378* (2013.01); *H04N 5/77* (2013.01)

(58) Field of Classification Search
CPC ....... H04N 5/23229; H04N 5/77; H04N 5/378

USPC ...................................................... 348/222.1
See application file for complete search history.

(56) References Cited

U.S. PATENT DOCUMENTS

| | | | | |
|---|---|---|---|---|
| 2006/0119711 | A1* | 6/2006 | Ejima | H04N 1/2112 348/222.1 |
| 2009/0219428 | A1* | 9/2009 | Nakano | H04N 5/347 348/308 |
| 2013/0068929 | A1* | 3/2013 | Solhusvik | H01L 27/14634 250/208.1 |

FOREIGN PATENT DOCUMENTS

JP 2015-136093 A 7/2015

* cited by examiner

*Primary Examiner* — Usman A Khan
(74) *Attorney, Agent, or Firm* — Cowan, Liebowitz & Latman, P.C.

(57) ABSTRACT

An image capturing apparatus comprises an image sensor, an image processor and a controller. The image sensor includes pixels each having a photoelectric conversion element and a signal storing unit. The controller transfers image signals to the image processor in a predetermined period if the image signals is a first image signal, and stores, if the image signals is a second image signal, the image signals output from the pixels in the signal storing unit, and transfers some of the image signals stored in the signal storing unit to the image processor during an interval in which the first image signals are transferred to the image processor. The image processor switches image processing in accordance with the type of the image signals transferred from the image sensor.

12 Claims, 11 Drawing Sheets

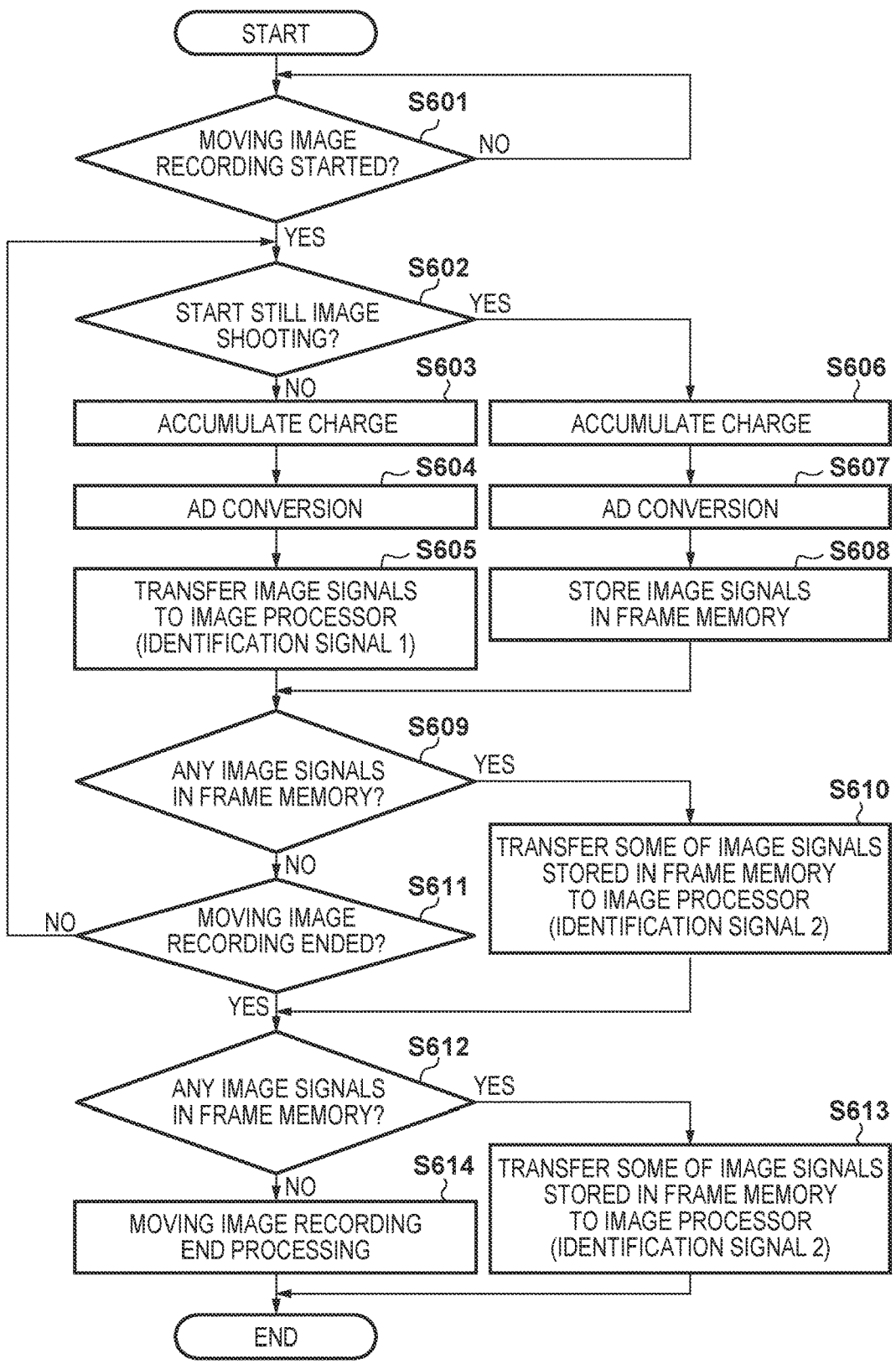

IMAGE CAPTURING APPARATUS AND CONTROL METHOD UTILIZING AN IMAGE SENSOR WITH TWO-DIMENSIONAL PIXELS AND PIXEL SIGNAL STORING UNIT

BACKGROUND OF THE INVENTION

Field of the Invention

The present invention relates to image capturing apparatuses and control methods of the same.

Description of the Related Art

In an image capturing apparatus such as a digital camera, image signals output from an image capturing unit are transferred to an image processor based on control performed by a system controller, and image data after being subjected to image processing by the image processor is recorded in a recording medium. When image signals of a large data size are continuously generated and processed at high speed, the capability to transfer data from the image capturing unit to the image processor may be a constraint on the processing speed.

To avoid the aforementioned data transfer capability constraining the processing speed, Japanese Patent Laid-Open No. 2015-136093 proposes an image capturing apparatus that includes a frame memory in an image capturing unit. In Japanese Patent Laid-Open No. 2015-136093, image signals that are output at high speed from an image capturing unit are temporarily stored in the frame memory, and the image signals stored in the frame memory can be transferred to the image processor asynchronously with the timing at which the image signals are output.

Some digital cameras have a function that allows the user to shoot a still image while recording a moving image, i.e. a function of shooting a still image while recording a moving image. If this function is provided in the image capturing apparatus described in Japanese Patent Laid-Open No. 2015-136093, it is necessary to temporarily store image signals for recording a still image in a frame memory based on an instruction to shoot a still image that is made by the user while recording a moving image, and transfer the image signals to the image processor after the recording of the moving image ends to perform processing to record a still image. For this reason, if the capacity of the frame memory runs short, a still image cannot be shot until recording of a moving image ends.

SUMMARY OF THE INVENTION

The present invention has been made in consideration of the aforementioned problems, and realizes an image capturing apparatus that avoids a situation where a still image cannot be shot while recording a moving image due to a shortage of the capacity of a memory provided in an image capturing unit.

In order to solve the aforementioned problems, the present invention provides an image capturing apparatus comprising: an image sensor including two-dimensionally arranged pixels each having a photoelectric conversion element, and a signal storing unit in which image signals that are output from the pixels are stored; an image processor which performs image processing on image signals that are read out from the image sensor, the image processing corresponding to the type of the image signals; and a controller which performs control for transferring the image signals read out from the image sensor to the image processor in a predetermined period if the type of the image signals is a first image signal, and for storing, if the type of the image signals is a second image signal, the image signals output from the pixels in the signal storing unit, and transferring some of the image signals stored in the signal storing unit to the image processor during an interval in transfer of the first image signals to the image processor, wherein the image processor switches image processing in accordance with the type of the image signals transferred from the image sensor.

In order to solve the aforementioned problems, the present invention provides an image capturing apparatus comprising: an image sensor including two-dimensionally arranged pixels each having a photoelectric conversion element, and a signal storing unit in which image signals that are output from the pixels are stored; an image processor which performs image processing on image signals that are read out from the image sensor, the image processing corresponding to the type of the image signals; and a controller which performs control for transferring first image signals that are some of the image signals stored in the signal storing unit to the image processor in a predetermined period, and transferring second image signals that are the image signals stored in the signal storing unit to the image processor during an interval in transfer of the first image signals to the image processor, wherein the image processor switches image processing in accordance with the type of the image signals transferred from the image sensor.

In order to solve the aforementioned problems, the present invention provides a control method of an image capturing apparatus which has: an image sensor including two-dimensionally arranged pixels each having a photoelectric conversion element, and a signal storing unit in which image signals that are output from the pixels are stored; and an image processor which performs image processing on image signals that are read out from the image sensor, the image processing corresponding to the type of the image signals, the method comprising: transferring the image signals read out from the image sensor to the image processor in a predetermined period if the type of the image signals is a first image signal; performing control for storing, if the type of the image signals is a second image signal, the image signals output from the pixels in the signal storing unit, and transferring some of the image signals stored in the signal storing unit to the image processor during an interval in transfer of the first image signals to the image processor; and switching image processing in accordance with the type of the image signals transferred from the image sensor, by the image processor.

In order to solve the aforementioned problems, the present invention provides a control method of an image capturing apparatus which has: an image sensor including two-dimensionally arranged pixels each having a photoelectric conversion element, and a signal storing unit in which image signals that are output from the pixels are stored; and an image processor which performs image processing on image signals that are read out from the image sensor, the image processing corresponding to the type of the image signals, the method comprising: transferring first image signals that are some of the image signals stored in the signal storing unit to the image processor in a predetermined period; performing control for transferring the image signals stored in the signal storing unit to the image processor during an interval in transfer of the first image signals to the image processor; and switching image processing in accordance with the type of the image signals transferred from the image sensor, by the image processor.

According to the present invention, it is possible to avoid a situation where a still image cannot be shot while recording a moving image due to a shortage of the capacity of a memory provided in an image capturing unit, and the wait time for processing a still image after the recording of a moving image ends can be shortened or eliminated.

Further features of the present invention will become apparent from the following description of exemplary embodiments with reference to the attached drawings.

BRIEF DESCRIPTION OF THE DRAWINGS

FIG. 6 is a flowchart of an operation of an image capturing unit during still image shooting while recording a moving image according to a first embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

Apparatus Configuration

The functions and external appearance of a digital camera according to the present embodiment will be described below with reference to FIGS. 1 and 2.

Figure 1:
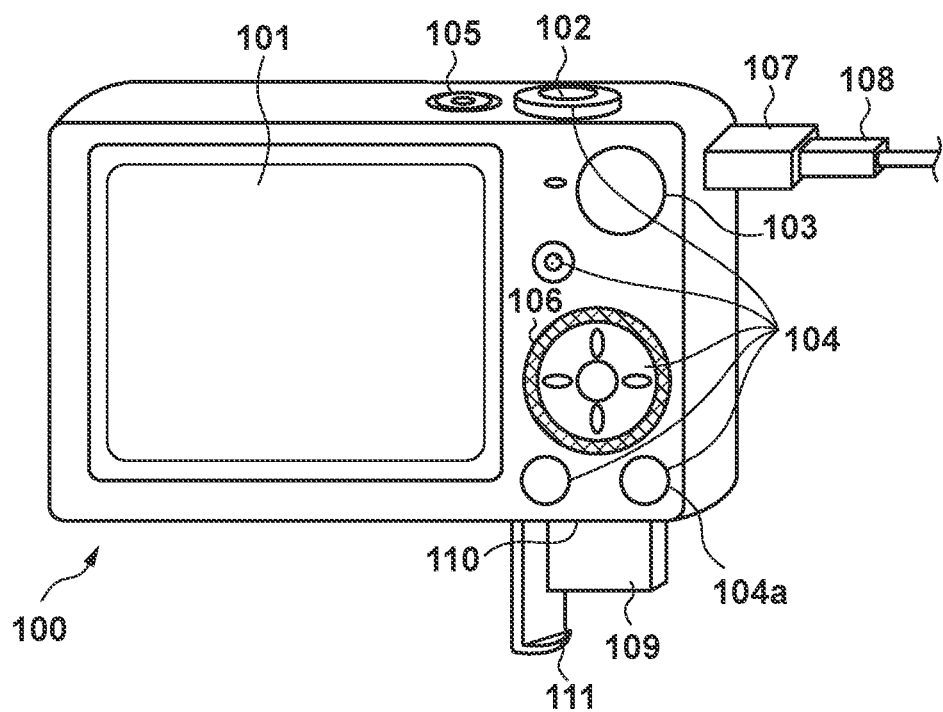
FIG. 1 is a diagram showing an appearance of an image capturing apparatus according to a present embodiment.

In FIG. 1 which shows an external appearance of a digital camera 100 according to the present embodiment, a display unit 101 displays images and various information. A shutter-release button 102 is an operation unit for shooting. A mode switching button 103 is an operation unit for changing over among various modes. A connector 107 is an interface that connects a connection cable 108 with a digital camera 100. Operation units 104 comprise operation members such as various switches, buttons and a touch panel operated in various ways by the user. A controller wheel 106 is a rotatable operation member included among the operation units 104. A power switch 105 is a push-button type operation member for switching between power on and power off.

A recording medium 109 is a medium such as a memory card or hard disk. A recording medium slot 110 is for accommodating the recording medium 109. The recording medium 109 accommodated in the recording medium slot 110 makes it possible to communicate with the digital camera 100. A cover 111 covers the recording medium slot 110. FIG. 1 shows a state in which the recording medium 109 is partially exposed as it is being removed from the slot 110 by opening the cover 111.

Figure 2:
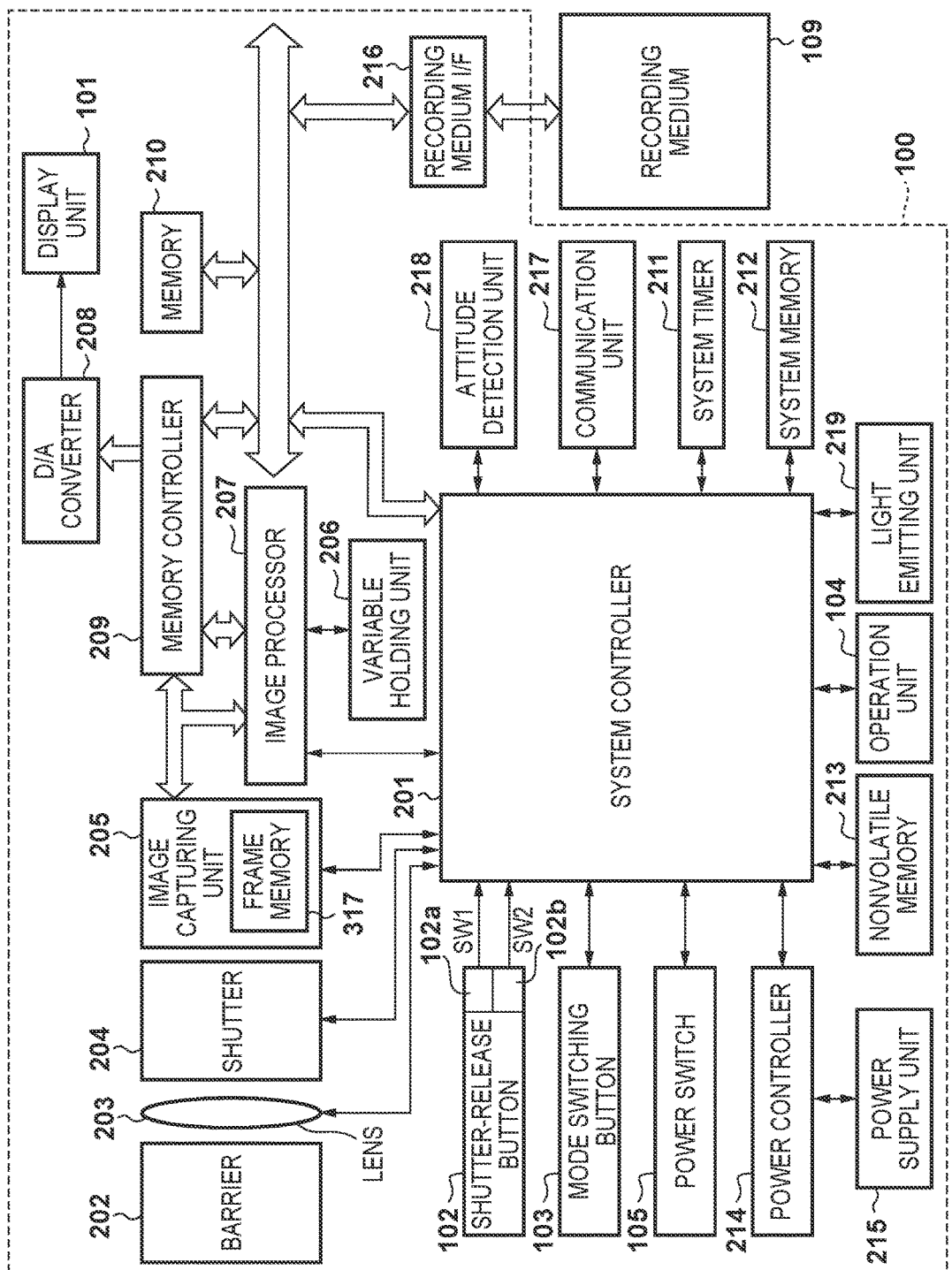
FIG. 2 is a block diagram showing an image capturing apparatus according to the present embodiment.

In FIG. 2 which shows an internal configuration of a digital camera 100 according to the present embodiment, a photographing lens 203 includes a zoom lens and a focusing lens. A shutter 204 has a diaphragm function. An image capturing unit 205 is an image sensor 300, which is constituted by a CCD or CMOS or the like, for converting the optical image of an object to an electric signal. As will be described later, the image capturing unit 205 has a stacked structure in which a first semiconductor substrate (imaging layer) 300A is stacked on a second semiconductor substrate (circuit layer) 300B, and an image signal read out from the first semiconductor substrate 300A is processed by the second semiconductor substrate 300B and is output to an image processor 207.

A barrier 202 covers the image capturing system which includes the photographing lens 203 of the digital camera 100, thereby preventing contamination of and damage to the image capturing system that includes the photographing lens 203, shutter 204 and image capturing unit 205.

A variable holding unit 206 is a memory for storing parameters and state variables that are to be used in various kinds of processing and calculation performed by the image processor 207. The variable holding unit 206 is provided with a plurality of memory areas for storing parameters and state variables for multiple kinds of image processing, and can selectively switch connection to the image processor 207.

An image processor 207 performs resizing processing, such as predetermined pixel interpolation and reduction, and color conversion processing, with respect to data from the image capturing unit 205 or data from a memory controller 209, using a parameter and/or state variable held in the variable holding unit 206. Further, the image processor 207 performs predetermined calculation processing using the captured image data, and the system controller 201 performs exposure control and distance measuring control based on the calculation results. Thus, AF (Automatic Focus) processing, AE (Automatic Exposure) processing, and EF (flash pre-emission) processing of TTL (Through the Lens) type are performed. Furthermore, the image processor 207 performs predetermined calculation processing using the captured image data, and AWB (Automatic White Balance) processing of TTL type is performed on the basis of the calculation results.

The data from the image capturing unit 205 is directly written into a memory 210 via both the image processor 207 and the memory controller 209 or via the memory controller 209. The memory 210 stores the image data obtained from the image capturing unit 205, and image display data to be displayed on the display unit 101. The memory 210 has a storage capacity that is sufficient for storing a predetermined number of still images as well as moving images and audio for a predetermined time period.

The memory 210 also functions as a memory for image display (video memory). A D/A converter 208 converts the image display data stored in the memory 210 into an analog signal and applies the display unit 101 with the analog signal. The image display data that was written into the memory 210 is displayed by the display unit 101 via the D/A converter 208. The display unit 101 performs, on a display device such as an LCD, display in accordance with the analog signal from the D/A converter 208. The digital signals output from the image capturing unit 205 and stored in the memory 210 are converted into analog signals by the D/A converter 208, and the analog signals are successively transmitted to the display unit 101 so as to be displayed thereon, making it possible to realize an electronic view finder (EVF) functionality and to perform through-the lens image display.

A nonvolatile memory 213 is, for example, an EEPROM, which is electrically erasable and recordable. In the nonvolatile memory 213, constants and programs, for example, for operating the system controller 201 are stored. In this context, "programs" may refer to programs for executing various flowcharts that will be described later.

The system controller 201 is a calculation processing device for overall controlling the entire camera 100, and realizes, by executing the programs stored in the nonvolatile memory 213, the procedures of the flowchart that will be described later. The system memory 212 is, for example, a RAM and used also as a work memory where constants and variables for operating the system controller 201, and the programs read out from the nonvolatile memory 213 are expanded. The system controller 201 controls the memory 210, the D/A converter 208, the display unit 101, and the like, so as to perform display control.

A system timer 211 is a timer circuit for measuring time periods for various types of controls and the time of an integrated clock.

A mode switching button 103, a first shutter switch 102a, a second shutter switch 102b, and the operation units 104 are operation members for inputting various types of instructions into the system controller 201. The operation units 104 include a moving image recording button 104a for the user inputting a stat instruction for a moving image recording.

The mode switching button 103 switches the operation mode of the system controller 201 to any of a still image shooting mode, a moving image recording mode, and a reproduction mode. The still image shooting mode includes an automatic shooting mode, an automatic scene determination mode, a manual mode, various types of scene modes in which different settings are configured for individual shooting scenes, a program AE mode, a custom mode, and the like. Using the mode switching button 103, the mode is directly switched to any of the plurality of modes included in the still image shooting mode. Alternatively, it is also possible to switch, using the mode switching button 103, to the still image shooting mode and then to switch, using another operation member, to any of the plurality of modes included in the still image shooting mode. Similarly, also the moving image recording mode may include a plurality of modes.

While the shutter button 102 provided on the camera 100 is being operated, that is, pressed half-way (the shooting preparation instruction), the first shutter switch 102a is turned on and generates a first shutter switch signal SW1. Upon receiving the first shutter switch signal SW1, the system controller 201 causes the image processor 207 to start the AF (Automatic Focus) processing, the AE (Automatic Exposure) processing, the AWB (Automatic White Balance) processing, the EF (flash pre-emission) processing and the like.

When the operation of the shutter button 102 is completed, that is, the shutter button 102 is pressed fully (the shooting instruction), the second shutter switch 102b is turned on and generates a second shutter switch signal SW2. Upon receiving the second shutter switch signal SW2, the system controller 201 starts a series of shooting processing from reading out the signal from the image capturing unit 205 to writing of image data to the recording medium 109.

By selecting various functional icons displayed on the display unit 101, appropriate functions for each situation are assigned to the operation units 104, and the operation units 104 thus act as various function buttons. Examples of these function buttons include an end button, a back button, an image scrolling button, a jump button, a narrow-down button, an attribute change button. For example, a notification for a menu switching instruction is given and a menu screen that enables various settings to be made is displayed on the display unit 101 by pressing a menu button. The user can make various settings intuitively by using the menu screen, which is displayed on the display unit 101, four-direction (up, down, left, right) buttons and a SET button.

Included among the operation units 104 is also a touch panel as a touch detecting unit capable of detecting a touch operation on the display unit 101. The touch panel and the display unit 101 can be constructed as a single integrated unit. For example, the touch panel is constructed in such a manner that the transmittance of light will not interfere with the display presented by the display unit 101, and it is attached to the uppermost layer of the display face of the display unit 101. In addition, input coordinates on the touch panel and display coordinates on the display unit 101 are correlated. As a result, a GUI can be constructed that makes it possible for the user to directly manipulate the screen displayed on the display unit 101.

The controller wheel 106, which is a rotatable operation member included among the operation units 104, is used together with the direction buttons as when a selection item is specified. When the controller wheel 106 is turned, an electrical pulse signal is generated in accordance with the amount of rotation, and the system controller 201 controls each unit of the digital camera 100 based upon the pulse signal. The angle through which the controller wheel 106 has been turned and how many times it has been turned can be determined by the pulse signal. It should be noted that the controller wheel 106 can be any operating member so long as it is an operating member whose rotation can be detected. For example, it can be a dial operating member in which the controller wheel 106 per se is rotated to generate the pulse signal in accordance with a turning operation by the user. Further, it can be a device (a so-called touch wheel) that detects an operation such as the revolution of the user's finger on the controller wheel 106 without by controller wheel 106 itself being rotated.

A power controller 214 is constituted by, for example, a battery detection circuit, a DC-DC converter, a switch circuit for changing over the block to be supplied with power, and detects a battery has been inserted or not, the type of the battery, and the residual capacity thereof. Further, the power controller 214 controls the DC-DC converter in accordance with the detection results and an instruction of the system controller 201, and supplies a necessary voltage for a necessary length of time to each of the units including the recording medium 109.

A power supply unit 215 is constituted by a primary battery such as an alkaline battery or a lithium battery, a secondary battery such as a NiCd battery, a NiMH battery, or a lithium-ion battery, an AC adapter, or the like. A recording medium I/F 216 is an interface for connection to the recording medium 109 such as a memory card or a hard disk. The recording medium 109 is a recording medium such as a memory card for recording a captured image, and is constituted by a semiconductor memory, a magnetic disk, or the like.

A communication unit 217 performs transmitting/receiving video and sound to/from an external device communicably connected via a wireless antenna or wired cable may be incorporated. The communication unit 217 is also connectable to a wireless LAN (Local Area Network) and the Internet. The communication unit 217 can transmit an image (including a through image) captured by the image capturing unit 205 and an image file recorded in the recording medium 109 to an external device, and receive image data and other various kinds of information from an external device.

An attitude detection unit 218 detects the attitude of the digital camera 100 with respect to the gravity direction. In this case, based on the orientation detected by the attitude detection unit 218, it is possible to discriminate whether an image captured by the image capturing unit 205 has been shot by setting the digital camera 100 in the landscape or portrait direction. The system controller 201 can add information about the attitude detected by the attitude detection unit 218 to the image file, and rotate and record the captured image. An attitude detection unit 218 such as An acceleration sensor, gyro sensor and the like may be used as an attitude detection unit.

A light emitting unit 219 includes an LED (light emitting diode) and the like. The light emitting unit 219 includes a flash function for notifying an object of the operating state (for example, a self-timer countdown, shooting start/end, and so on) of the digital camera 100 based on a predetermined light-emitting/non-light-emitting pattern, and for emitting a flash for illuminating the subject.

Note that the hardware configuration is not limited to that shown in FIG. 2, and a configuration is also possible in which, for example, a single item of hardware performs display control, communication control, recording control, image processing control, and the like, so as to function as each unit or block of the digital camera 100. Alternatively, it is also possible that a plurality of items of hardware operate in cooperation with each other to function as a single unit or block.

Image Sensor Configuration

A description will be given, with reference to FIG. 3, of an outline of a configuration and functions of an image sensor 300 according to the present embodiments.

Figure 3:
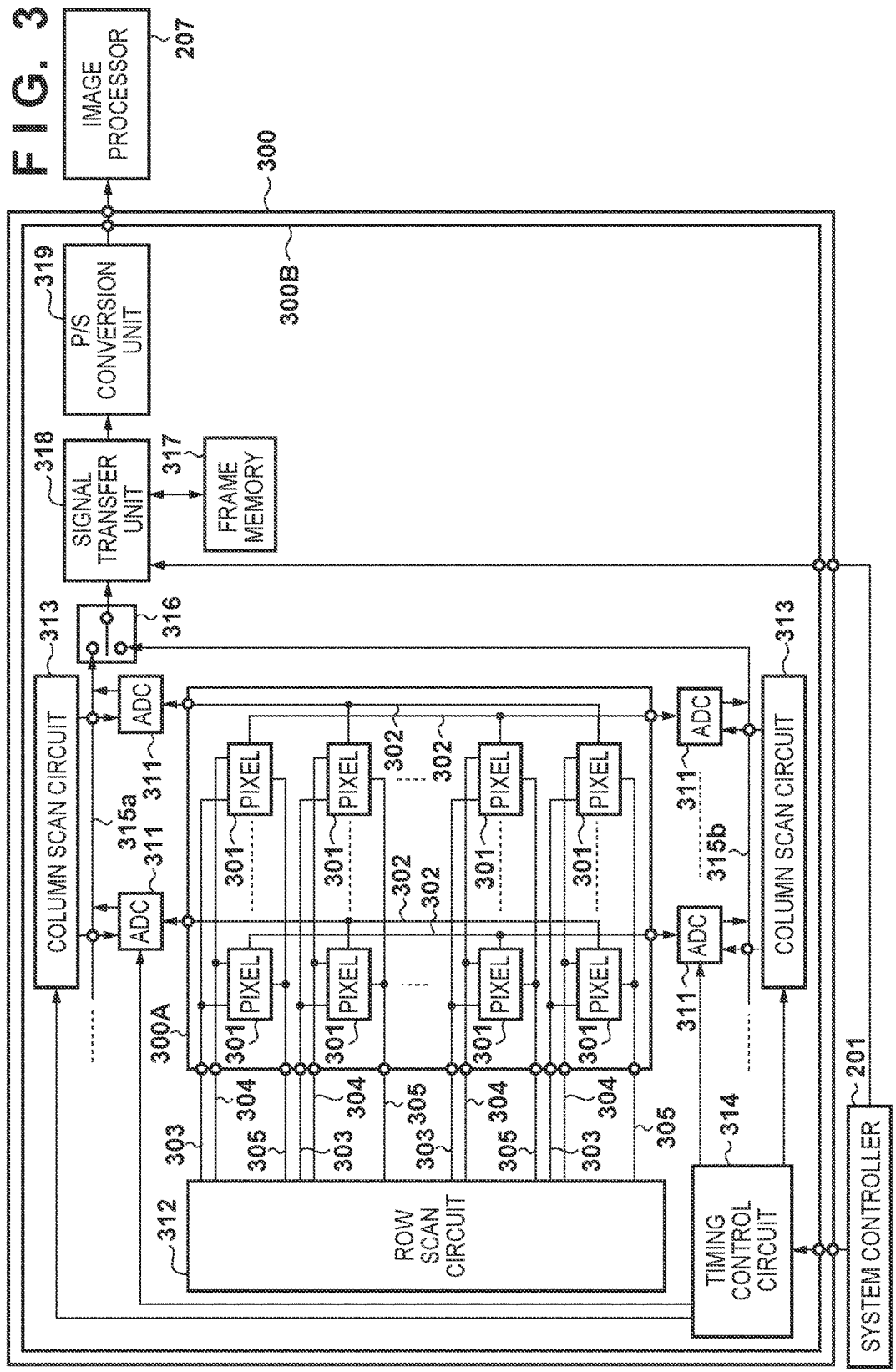
FIG. 3 is a diagram showing a schematic configuration of an image sensor according to the present embodiment.

In FIG. 3, an image sensor 300 has a first semiconductor substrate (imaging layer) 300A, and a second semiconductor substrate (circuit layer) 300B. A timing control circuit 314 and a signal transfer unit 318 on the second semiconductor substrate 300B are controlled by a system controller 201 such that a pixel signal output from the first semiconductor substrate 300A is processed by the second semiconductor substrate 300B, and is transferred to a signal processor 207, which is provided outside the image sensor 300.

The image sensor 300 has a stacked structure in which the first semiconductor substrate 300A is stacked on the second semiconductor substrate 300B. The first semiconductor substrate 300A includes a pixel region in which a plurality of pixels 301 each having a photoelectric conversion element such as a photodiode are two-dimensionally arranged. The first semiconductor substrate 300A on which the plurality of pixels 301 are arranged is disposed on the light-incident side (i.e. located on the side on which an optical image of an object is received). In the first semiconductor substrate 300A, vertical output lines (column output lines) 302 are connected to the pixels 301 in respective columns in the vertical direction (column direction), and transfer signal lines 303, reset signal lines 304, and row selection signal lines 305 are connected to the pixels in respective rows in the horizontal direction (row direction). Note that the vertical output lines 302 are connected to different pixels in accordance with a readout row unit.

The second semiconductor substrate 300B is provided with a pixel driver that includes AD conversion circuits (hereinafter, column ADCs) 311, a row scan circuit 312, column scan circuits 313, a timing control circuit 314, horizontal signal lines 315a and 315b, and an output switch 316. The second semiconductor substrate 300B is also provided with a frame memory (signal storing unit) 317, a signal transfer unit 318, and a P/S conversion unit 319.

In the pixel driver in the second semiconductor substrate 300B, the column ADCs 311 are connected to the vertical output lines 302, and convert a pixel signal output from each of the plurality of pixels 301 to the corresponding vertical output line 302 into a digital image signal. The row scan circuit 312 is connected to the transfer signal lines 303, the reset signal lines 304, and the row selection signal lines 305. The column scan circuits 313 are connected to the horizontal signal lines 315a and 315b, and outputs a column scan signal to the column ADCs 311. The timing control circuit 314 is connected to the column ADCs 311 and the column scan circuits 313, and outputs a timing signal. The horizontal signal lines 315a and 315b are connected to the output switch 316, and digital image signals are output thereto from the column ADCs 311.

The output switch 316 selectively and sequentially supplies, to the signal transfer unit 318, the digital image signals output from the column ADCs 311 to the horizontal signal line 315a and the horizontal signal line 315b for respective channels. The frame memory 317 temporarily stores digital image signals corresponding to at least one frame that are supplied to the signal transfer unit 318. The signal transfer unit 318 temporarily stores digital image signals supplied from the output switch 316, or transfers digital image signals to the image processor 207 via the parallel/serial (P/S) conversion unit 319 without storing digital image signals in the frame memory 317. The details of the signal transfer unit 318 will be described later. The P/S conversion unit 319 performs parallel/serial conversion on digital image signals output from the signal transfer unit 318, and outputs the resultant image signals to the image processor 207 which is provided outside the image sensor 300.

Thus, the pixel region in which the plurality of pixels 301 are arranged is formed on the first semiconductor substrate 300A, and a pixel drive circuit, a memory circuit, a computing circuit, and the like are formed on the second semiconductor substrate 300B. With this configuration, manufacturing processes can be separated between the imaging layer and the circuit layer of the image sensor 300. Accordingly, an increase in the readout speed, a reduction in the size, and an improvement in functionality can be achieved by thinning the wiring (interconnection) in the circuit layer and increasing the density thereof.

Circuitry of Pixel and Column ADC

Figure 4A:
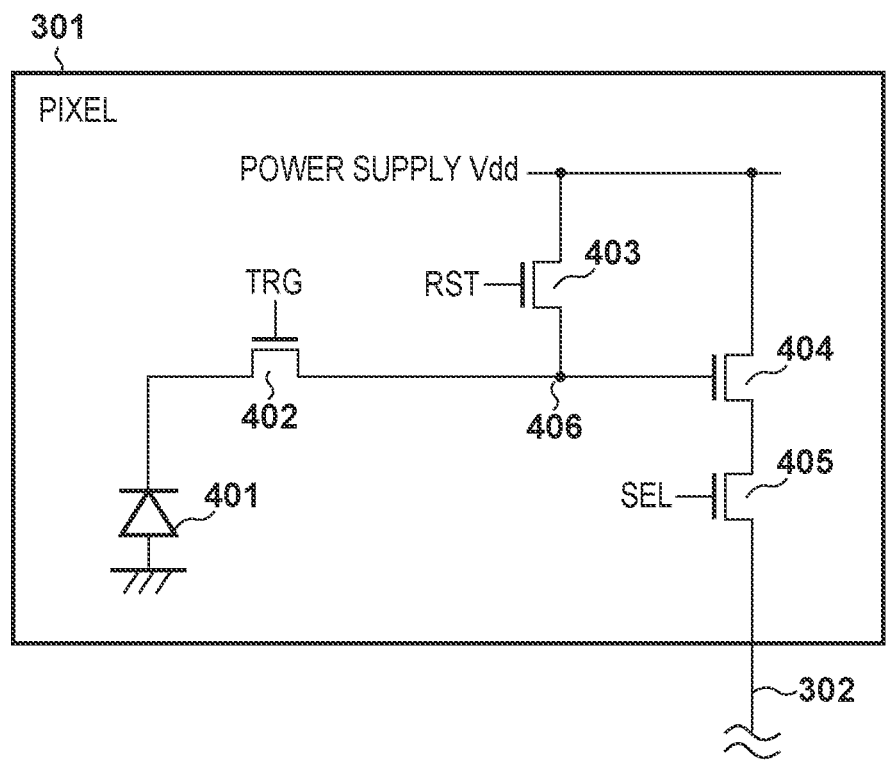
FIGS. 4A and 4B are diagrams showing a configuration of a pixel and a column ADC according to the present embodiment.
Figure 4B:
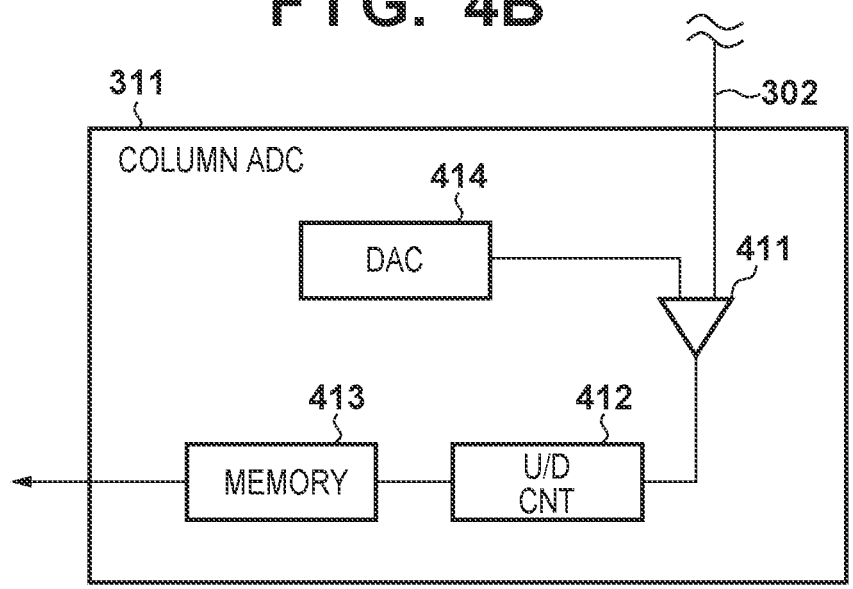

Next, a description will be given, with reference to FIGS. 4A and 4B, of a circuitry of the pixel 301 and the column ADC 311 in the image sensor 300 shown in FIG. 3.

Each pixel 301 has a photodiode 401 and four transistor circuits, which are a transfer transistor 402, a reset transistor 403, an amplifier transistor 404, and a selection transistor 405. These transistors 402 to 405 are N-channel MOS transistors, for example.

The photodiode 401 photoelectrically converts received light into a photocharge (electron) of a charge amount that corresponds to the light amount thereof. The cathode of the photodiode 401 is electrically connected to the gate of the amplifier transistor 404 via the transfer transistor 402. A node 406 that is electrically connected to the gate of the amplifier transistor 404 is called an FD (floating diffusion) portion.

The transfer transistor 402 is connected between the cathode of the photodiode 401 and the FD portion 406. The transfer transistor 402 turns on as a result of a transfer pulse cTRG being applied to the gate thereof via a transfer line (not shown), and transfers the photocharge obtained through photoelectric conversion in the photodiode 401 to the FD portion 406.

The drain and the source of the reset transistor 403 are connected respectively to a pixel power supply Vdd and the FD portion 406. The reset transistor 403 turns on as a result of a reset pulse cRST being applied to the gate thereof via a reset line (not shown). The reset transistor 403 resets the FD portion 406 by transferring charges in the FD portion 406 to the pixel power supply Vdd, prior to transferring signal charges from the photodiode 401 to the FD portion 406.

The gate and the drain of the amplifier transistor 404 are connected respectively to the FD portion 406 and the pixel power supply Vdd. The amplifier transistor 404 outputs, as a reset level, the potential of the FD portion 406 after being reset by the reset transistor 403, and also outputs, as a signal level, the potential of the FD portion 406 after signal charges have been transferred by the transfer transistor 402.

The drain and the source of the selection transistor 405 are connected respectively to the source of the amplifier transistor 404 and the vertical output line 302, for example. The selection transistor 405 turns on as a result of a selection pulse pSEL being applied to the gate thereof via a selection line (not shown), and sets the photodiode 401 to a selected state to relay a signal output from the amplifier transistor 404 to the vertical output line 302.

Note that a circuitry may also be employed in which the selection transistor 405 is connected between the pixel power supply Vdd and the drain of the amplifier transistor 404. The circuitry is not limited to one in which one pixel 301 is constituted by four transistors as shown in FIGS. 4A and 4B, and one pixel 301 may be constituted by three transistors including a transistor that serves as both the amplifier transistor 404 and the selection transistor 405, for example.

The pixel signal output from a pixel 301 via the vertical output line 302 is transferred to the column ADC 311. The column ADC 311 includes a comparator 411, an up/down counter (U/D CNT) 412, a memory 413, and a DA converter (DAC) 414.

The vertical output line 302 is connected to one of a pair of input terminals of the comparator 411, and the DAC 414 is connected to the other input terminal. The DAC 414 outputs a ramp signal whose level changes in an increasing or decreasing manner as time passes in accordance with a control signal from the timing control circuit 314.

The comparator 411 compares the level of the ramp signal input from the DAC 414 with the level of the pixel signal input from the vertical output line 302. For example, the comparator 411 outputs a high-level comparison signal if the pixel signal level is lower than the ramp signal level, and outputs a low-level comparison signal if the pixel signal level is higher than or equal to the ramp signal level.

The timing control circuit 314 outputs a reference signal to the DAC 414 in accordance with control performed by the system controller 201.

The up/down counter 412 is connected to an output terminal of the comparator 411, and measures the time period taken for the comparison signal to switch from the high level to the low level, for example. Through the counting processing, the output signal of each pixel 301 is converted into a complete digital signal value. Note that the up/down counter 412 measures the time period taken for the comparison signal to switch from the high level to the low level by counting up the pixel signal level from the count value obtained by counting down the reset level.

Note that a configuration may be employed in which an AND circuit is provided between the comparator 411 and the up/down counter 412, a pulse signal is input to this AND circuit, and the up/down counter 412 counts the number of pulse signals.

Thus, as a result of the column ADC 311 calculating a difference between the reset level and the pixel signal level, only pixel signals other than those of the reset level can be extracted.

The memory 413 is connected to the up/down counter 412 and stores the count value for the time period taken for the comparison signal to switch from the high level to the low level, when the up/down counter 412 counts the pixel signals. Note that a configuration may be employed in which the column ADC 311 counts the count value corresponding to the reset level based on a pixel signal at the time when a reset state of the pixel 301 is canceled, also counts the count value based on a pixel signal after a predetermined exposure time, and stores a difference value therebetween in the memory 413.

The count value stored in the memory 413 is transferred, as a digital value corresponding to the pixel signal, to a corresponding one of the horizontal signal line 315a and the horizontal signal line 315b synchronously with a signal from the corresponding column scan circuit 313.

Figure 5A:
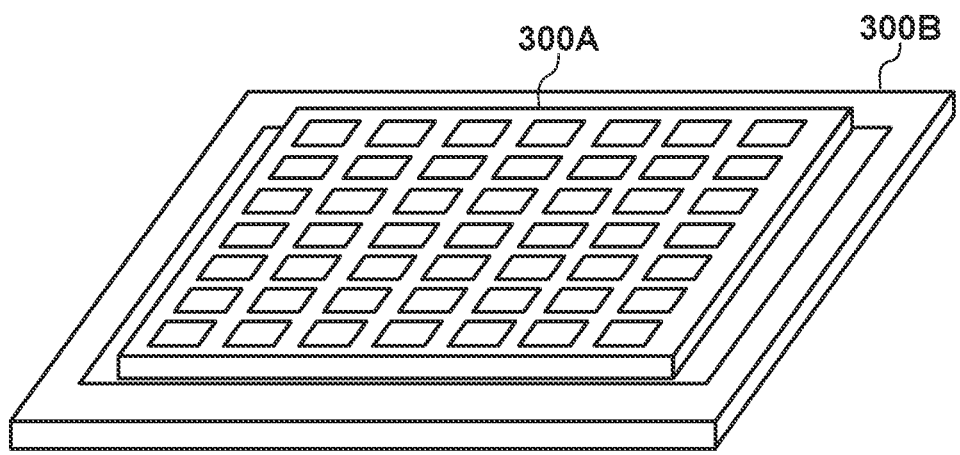
FIGS. 5A and 5B are diagrams showing a stacked structure of the image sensor according to the present embodiment.
Figure 5B:
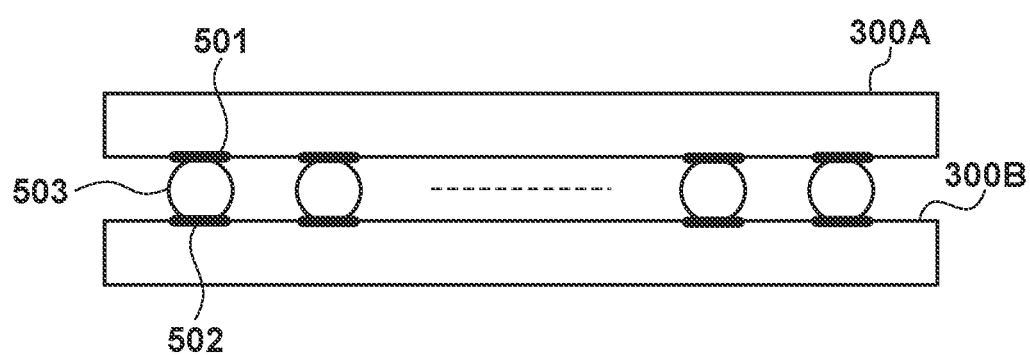

FIGS. 5A and 5B show an exemplary stacked structure of the first semiconductor substrate 300A (imaging layer) and the second semiconductor substrate 300B (circuit layer) in the image sensor 300 according to the present embodiments.

The first semiconductor substrate (imaging layer) 300A and the second semiconductor substrate (circuit layer) 300B are fixed in a state where the first semiconductor substrate 300A is laid over the second semiconductor substrate 300B such that micro pads 501 and 502 of the respective semiconductor substrates are electrically connected to each other via micro bumps 503.

Processing to Shoot Still Image while Recording Moving Image

Next, a description will be given, with reference to FIG. 6, of an operation of the image capturing unit 205 performed during processing to shoot a still image while recording a moving image by the digital camera 100 according to the present embodiment.

In the present embodiment, during a moving image recording operation, the image capturing unit 205 periodically transfers image signals for recording a moving image, which are digital image signals output from the output switch 316 in the image sensor 300, to the image processor 207 for each frame, without storing the digital image signals in the frame memory 317. If the image capturing unit 205 receives an instruction to shoot a still image while recording a moving image, the image capturing unit 205 stores, in the frame memory 317, image signals for recording a still image, which are digital image signals output from the output switch 316 in the image sensor 300. The image capturing unit 205 then transfers the image signals for recording a still image stored in the frame memory 317 to the image processor 207 during intervals (VBLK periods) in transfer of the image signal for recording a moving image in a fixed period.

Note that the processing in FIG. 6 is realized as a result of the system controller 201 loading a program stored in the nonvolatile memory 213 into the system memory 212 to execute the program, and controlling the image capturing unit 205.

In step S601, if the image capturing unit 205 receives a moving image recording start signal from the system controller 201, the image capturing unit 205 starts the moving image recording operation. The system controller 201, upon receiving an instruction to start to record a moving image from the user through the recording button 104a, which is included in the operation units 104, outputs the moving image recording start signal to the image capturing unit 205.

In step S602, if the image capturing unit 205 receives a still image shooting start signal from the system controller 201 after starting the moving image recording operation in step S601, the image capturing unit 205 advances the processing to step S603, and if not, the image capturing unit 205 advances the processing to step S606. If the system controller 201 receives an instruction to start to shoot a still image while recording a moving image through the shutter-release button 102 that is included in the operation units 104, the system controller 201 outputs a still image shooting start signal to the image capturing unit 205.

In step S603, the image capturing unit 205 performs an accumulating operation to photoelectrically convert light received by the image sensor 300 in response to the moving image recording signal from the system controller 201. Note that this accumulating operation may be a signal accumulating operation dedicated to recording of a moving image in which electronic shutter control is performed in accordance with thinning readout of image signals for recording a moving image or the like, or may be an accumulating operation that is completely the same as that for a still image. If the image sensor 300 having two-dimensionally arranged photoelectric conversion elements has a structure in which a plurality of pixels are disposed for one microlens, an accumulating operation suitable for on-imaging plane phase difference AF using image signals with different parallaxes may be performed.

In step S604, in response to the moving image recording signal from the system controller 201, the image capturing unit 205 converts signal charges accumulated in step S603 into digital signals by the ADCs 311, and outputs the digital signals to the signal transfer unit 318 via the output switch 316. This AD conversion may also be different in tonality or the like between recording of a moving image and recording of a still image, or AD conversion performed when recording a moving image may be completely the same as AD conversion performed when recording a still image. If the image sensor 300 having two-dimensionally arranged photoelectric conversion elements has a structure in which a plurality of pixels are disposed for one microlens, an AD conversion operation suitable for on-imaging plane phase difference AF using image signals with different parallax may be performed.

In step S605, in response to the moving image recording signal from the system controller 201, the image capturing unit 205 causes the signal transfer unit 318 to transfer the image signals for recording a moving image to the image processor 207 in a fixed period without storing the digital image signals in the frame memory 317. This data is transferred frame-by-frame in a fixed period in accordance with the frame rate of the moving image that is being recorded. However, depending on the specifications of the function of shooting a still image while recording a moving image provided by the digital camera 100, this period is temporarily not kept in some cases where an instruction to start to shoot a still image while recording a moving image is made by the user. Further, depending on the specifications of the moving image recording function, the frame rate may change. Data is transferred from the image capturing unit 205 to the image processor 207 using a transmission technique such as LVDS (Low Voltage Differential Signaling), for example. In this case, an identification signal for enabling the type of each image signal to be identified by the image processor 207 is added to the head of a data row, such as a synchronization code section in LVDS. In the present embodiment, for example, an identification signal 1 is added to each image signal for recording a moving image before the image signal is transferred.

In step S606, the image capturing unit 205, which has received the still image shooting start signal while recording a moving image from the system controller 201 in step S602, performs an accumulating operation to photoelectrically convert the light received by the image sensor 300 as in step S603. In step S607, similar to step S604, the image capturing unit 205 converts signal charges accumulated in step S606 into digital signals by the ADCs 311, and outputs the digital signals to the signal transfer unit 318 via the output switch 316. In step S608, the image capturing unit 205 causes the signal transfer unit 318 to store, in the frame memory 317, the image signals for recording a still image output to the signal transfer unit 318.

In steps S609 and S610, in response to a control signal from the system controller 201, the image capturing unit 205 divides the image signals for recording a still image stored in the frame memory 317, and transfers the image signals to the image processor 207 during intervals (VBLK periods) in transfer of the image signals for recording a moving image. Specifically, if any image signals are stored in the frame memory 317, the image capturing unit 205 advances the processing to step S610, and if not, the image capturing unit 205 returns the processing to step S602 and repeats the moving image recording operation from step S602 to step S605. Note that the accumulating operation in step S603 or S606 for the next frame can already be performed when AD conversion in step S604 is performed, and in practice, processing in step S604 and subsequent steps for the current frame is performed while the accumulating operation in step S603 or S606 for the next frame is performed. The same applies to processing in step S607 and subsequent steps, and processing in step S607 and subsequent steps is performed while the accumulating operation in step S603 for the next frame is performed. In step S610, the image capturing unit 205 causes the signal transfer unit 318 to transfer some of the image signals stored in the frame memory 317 to the image processor 207 under a condition under which data transfer of the image signal for recording a moving image in step S605 to the image processor 207 is not interrupted. The condition under which data transfer in step S605 is not interrupted indicates a data volume with which data can be transferred during VBLK periods, which are vertical blanking periods (VBLK periods) from when transfer of image signals corresponding to one frame of a moving image to the image processor 207 is finished until data transfer for the next frame starts. Data of some of the image signals stored in the frame memory 317 are transferred to the image processor 207 so as to satisfy this condition, and in this case, as in step S605, an identification signal for enabling the type of each image signal to be identified by the image processor 207 is added to the image signals. In the present embodiment, an identification signal 2 is added to each image signal for recording a still image before the image data is transferred. After the processing in step S610 ends, the processing returns to step S602 and the moving image recording operation is continued.

In step S611, if the image capturing unit 205 receives a moving image recording end signal from the system controller 201, the image capturing unit 205 advances the processing to step S612. The system controller 201, upon receiving an instruction to end the recording of a moving image from the user through the recording button 104a included in the operation units 104, outputs the moving image recording end signal to the image capturing unit 205. If, in step S611, the image capturing unit 205 has not received a moving image recording end signal from the system controller 201, the image capturing unit 205 returns the processing to step S602 and continues the moving image recording operation.

In step S612, if any image signals are stored in the frame memory 317, the image capturing unit 205 advances the processing to step S613, and if not, the image capturing unit 205 advances the processing to step S614 to end the moving image recording operation.

In step S613, the image capturing unit 205 transfers, to the image processor 207, data of the image signals that have not been transferred to the image processor 207, from among the image signals stored in the frame memory 317. In step S613, similar to step S610, an identification signal for enabling the type of each image signal to be identified by the image processor 207 is added to the image signals. Note that, after data transfer in step S613 is started, the processing can be returned to step S601 to start again the moving image recording operation. In the moving image recording operation that is to be started again, a change may be made to the data size, data thinning, pixel addition, the frame rate, or the like. The accumulating operation in step S603 can be performed for the moving image recording operation that is started again while data is being transferred in step S613, and data transfer in step S613 is continued under the condition under which data transfer in step S605 at the new frame rate is not interrupted.

Processing to Shoot Still Image while Recording Moving Image

Next, a description will be given, with reference to FIG. 7, of an operation of the system controller 201 in the operation to shoot a still image while recording a moving image performed by the digital camera 100 according to the present embodiment.

Figure 7:
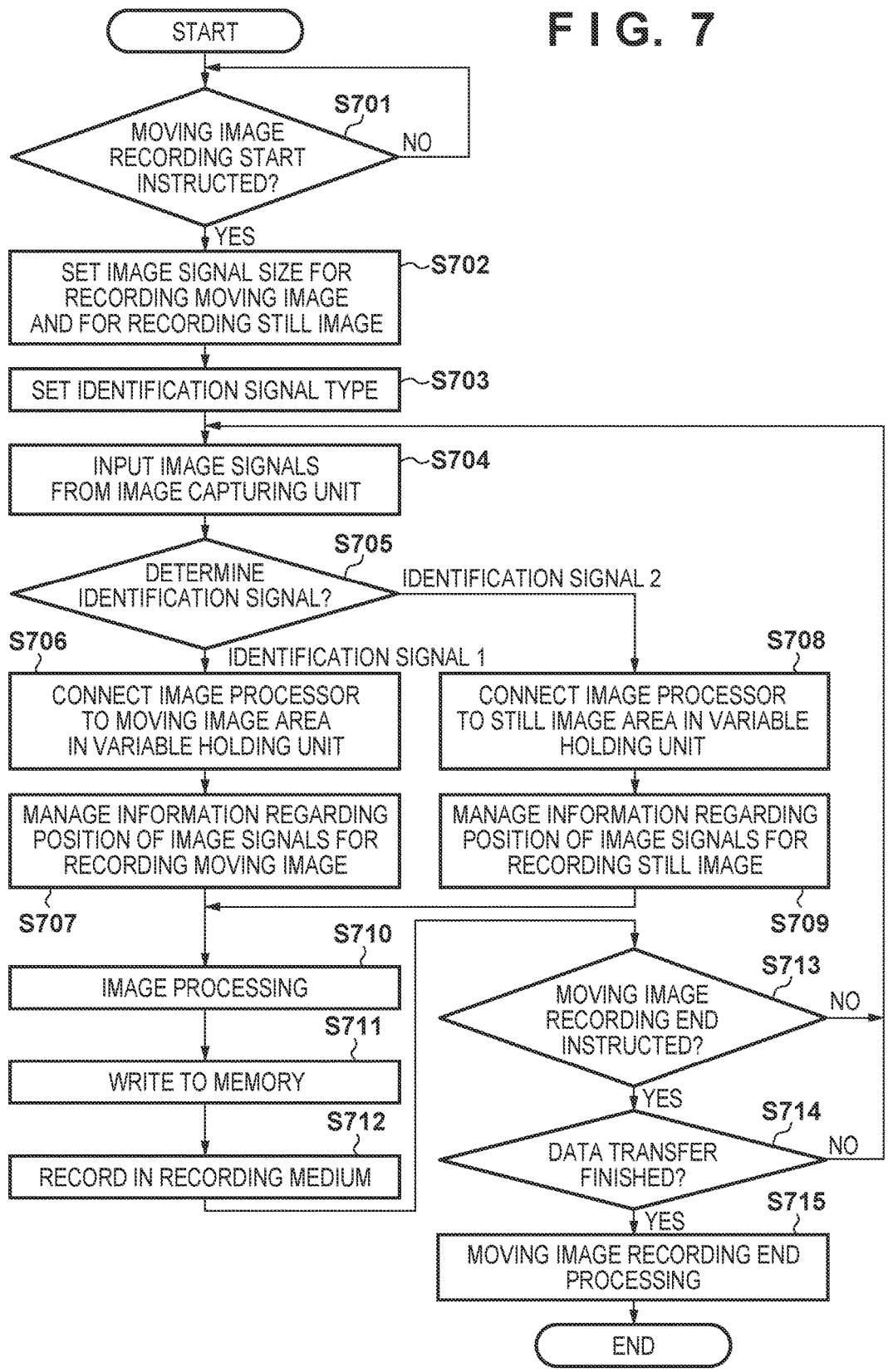
FIG. 7 is a flowchart of an operation of a system controller during still image shooting while recording a moving image according to the first embodiment.

Note that the processing in FIG. 7 is realized as a result of a program stored in the nonvolatile memory 213 being loaded into the system memory 212 and executed by the system controller 201.

In step S701, if the system controller 201 receives an instruction to start to record a moving image from the user through the recording button 104a that is included in the operation units 104, the system controller 201 outputs the moving image recording start signal to the image capturing unit 205 to start the moving image recording operation. Note that, although the present embodiment takes the moving image recording operation as an example, the same applies to live view, i.e. displaying a captured video on the display unit 101 in real time. In this case, only the processing to record image signals in the recording medium 109 in step S712 is changed to processing to output image signals to the display unit 101. However, image processing to be performed in this process is not always the same.

In step S702, the system controller 201 sets, for the image processor 207, the respective data sizes of image signals for recording a moving image and for recording a still image.

In step S703, the system controller 201 sets the type of the identification signal to an identification signal discrimination circuit 207a in the image processor 207. In the present embodiment, the identification signal 1 and the identification signal 2 are assigned respectively to image signals for recording a moving image and image signals for recording a still image.

In step S704, the image processor 207 inputs the image signals transferred from the image capturing unit 205 to the system controller 201.

In step S705, the system controller 201 causes the identification signal discrimination circuit 207a in the image processor 207 to determine the identification signal appended to the transferred image signals. If it is determined that the appended identification signal is the identification signal 1 (image signals for recording a moving image), the system controller 201 advances the processing to step S706, and if it is determined that the appended identification signal is the identification signal 2 (image signals for recording a still image), the system controller 201 advances the processing to step S708.

In step S706, the system controller 201 connects the image processor 207 to the variable holding unit 206 such that the image processor 207 can read out/write data from/to a moving image area in the variable holding unit 206.

In step S707, the system controller 201 updates values stored in the system memory 212, and manages information regarding the position of the image signals for recording a moving image. Specifically, the information regarding the position of the image signals for recording a moving image is information indicating the line number in one frame of image signals for recording a moving image that the image signal that is currently input to the image processor 207 pertains to. By managing this positional information, even if processing performed by the image processor 207 is switched (changed) to processing for other kinds of image signal during the process for one frame, when the data of the image signals for recording a moving image that have been processed until the switching of image processing is input again, processing for these image signals can be resumed based on the process of the image processing that has been performed thus far for image signals for recording a moving image in that one frame.

In step S708, the system controller 201 connects the image processor 207 to the variable holding unit 206 such that the image processor 207 can read out/write data from/to a still image area in the variable holding unit 206.

In step S709, the system controller 201 updates values stored in the system memory 212, and manages information regarding the position of the image signals for recording a still image. Specifically, the information regarding the position of the image signals for recording a still image is information indicating the line number in one frame of image signals for recording a still image that the image signal that is currently input to the image processor 207 pertains to. Similar to step S707, the information is for enabling, when image signals for recording a still image are intermittently processed, the processing based on the process of image processing that has been performed thus far to be resumed.

In step S710, the system controller 201 causes the image processor 207 to perform image processing (correction, development, compression etc.) on the image signals transferred from the image capturing unit 205 using parameters and/or variables for recording a moving image or a still image, as well as the information regarding the position of the image signals for recording a moving image or a still image.

In step S711, the system controller 201 controls the memory controller 209 to write, in the memory 210, the image data output from the image processor 207. Information regarding the write address at this time is also determined based on the information in the variable holding unit 206 and information regarding the position of the image signals.

In step S712, the system controller 201 records, in the recording medium 109, the image data that has been written in the memory 210 by the memory controller 209. Note that, since generation of an image file to be recorded in the recording medium 109 is not completed unless image data corresponding to at least one frame is ready, the writing of image data in the memory 210 in step S711 and the recording in the recording medium 109 in step S712 are not always performed successively. For example, still image data is divided and then transferred from the image capturing unit 205 over a plurality of frames of moving image data, and is processed by the image processor 207 to generate image data corresponding to one frame. Accordingly, the still image data corresponding to one frame is written in the memory 210, and is thereafter recorded in the recording medium 109 in step S712. On the other hand, moving image data is recorded in the recording medium 109 for each frame, and the processing from S704 to S712 is repeated to continue the moving image recording operation.

In step S713, if the system controller 201 receives an instruction to end the recording of a moving image from the user through the recording button 104a included in the operation units 104, the system controller 201 advances the processing to step S714. If, in step S713, the system controller 201 does not receive an instruction to end the recording of a moving image, the system controller 201 returns the processing to step S704, and continues the moving image recording operation.

In step S714, the system controller 201 determines whether or not the transfer of the image signals for recording a still image from the image capturing unit 205 has finished, continues the processing from step S704 to step S712 until the data transfer finishes, and advances the processing to step S715 after the data transfer has finished. Note that the moving image recording operation in step S701 can be started again before the transfer of the image signals for recording a still image finishes. In this case, the system controller 201 updates a parameter group and a data group for the moving image area in the variable holding unit 206 for a new moving image.

In step S715, the system controller 201 outputs a moving image recording end signal to the image capturing unit 205, and ends the moving image recording operation.

Figure 8:
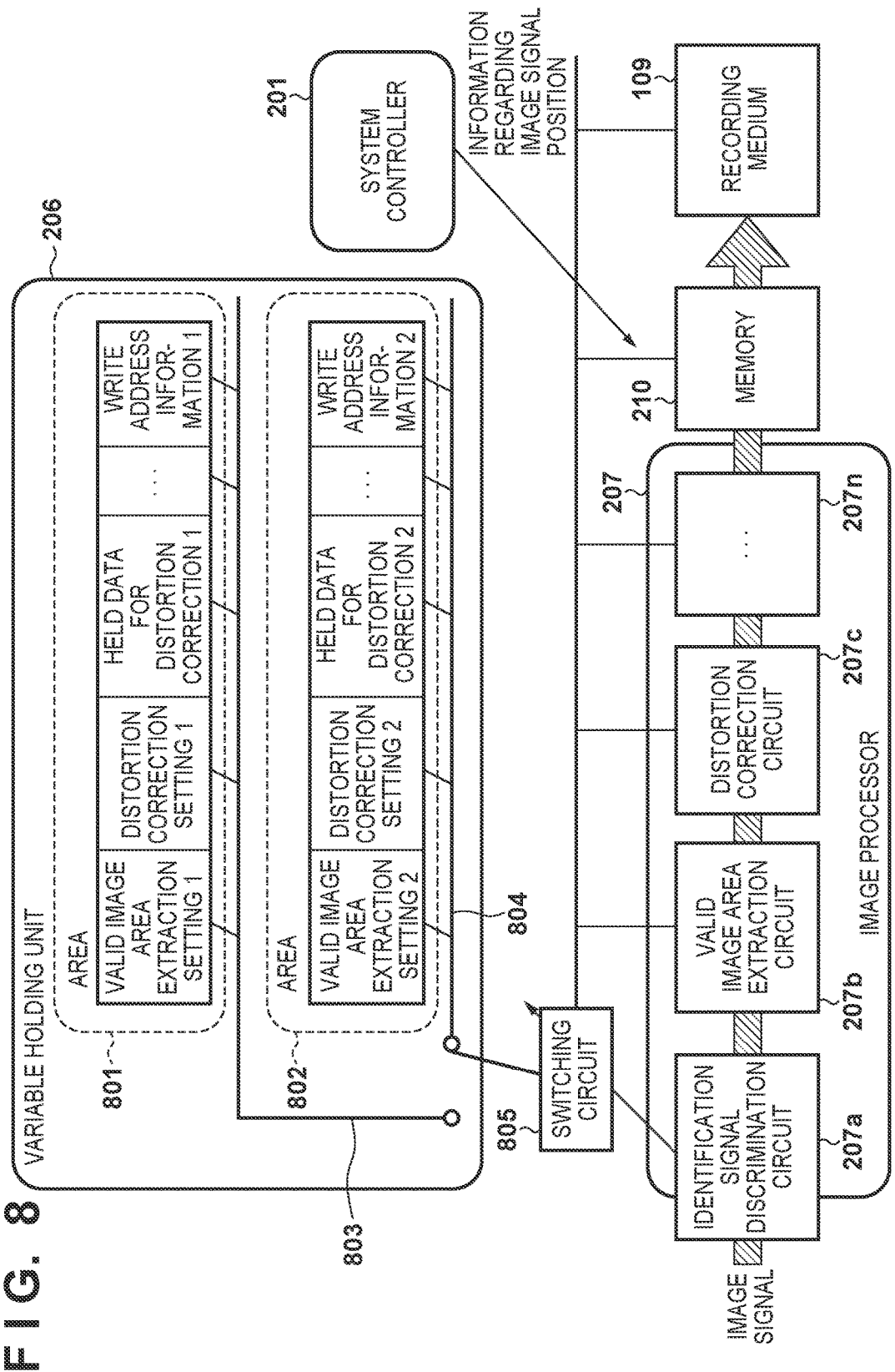
FIG. 8 is a diagram depicting control for switching image processing in accordance with the type of image signals according to this embodiment.

FIG. 8 is a diagram depicting a configuration for the image processor 207 to switch image processing in accordance with the type of image signals to be transferred. In the present embodiment, the variable holding unit 206 includes an area 801 and an area 802, and parameters that are to be used by the image processor 207, data that is to be held, write address information for writing data to the memory 210, and the like can be held in those areas. The number of such areas may be three or more. A switching circuit 805 can switch between terminals 803 and 804 for accessing the data held in the respective areas 801 and 802. The switching circuit 805 is connected to image processing circuit blocks 207b to 207n in the image processor 207, and a driver for writing data to the memory 210 and the recording medium 109. The switching circuit 805 switches its connection destination between the area 801 and the area 802 in the variable holding unit 206 in response to a signal from the identification signal discrimination circuit 207a that is provided near an input terminal of the image processor 207. With this configuration, the processing operation of the image processor 207 can be switched in accordance with the identification signal appended in the vicinity of the head of each image signal transferred to the image processor 207. The system controller 201 also manages the information regarding the position of the image signals that are currently being processed. The system controller 201 can appropriately control the degree of correcting distortion through a distortion correction circuit 207c, for example, by reflecting the information regarding the position of the image signals in the processing performed by the image processor 207. Also, with a method in which the information regarding the write address for writing data to the memory 210 is determined based on the information regarding the position of the image signals, even in the case where image signals corresponding one frame are transferred in an order other than the order in the downward or upward direction, the image data corresponding one frame can be written to the memory 210 in a correct order.

Figure 9:
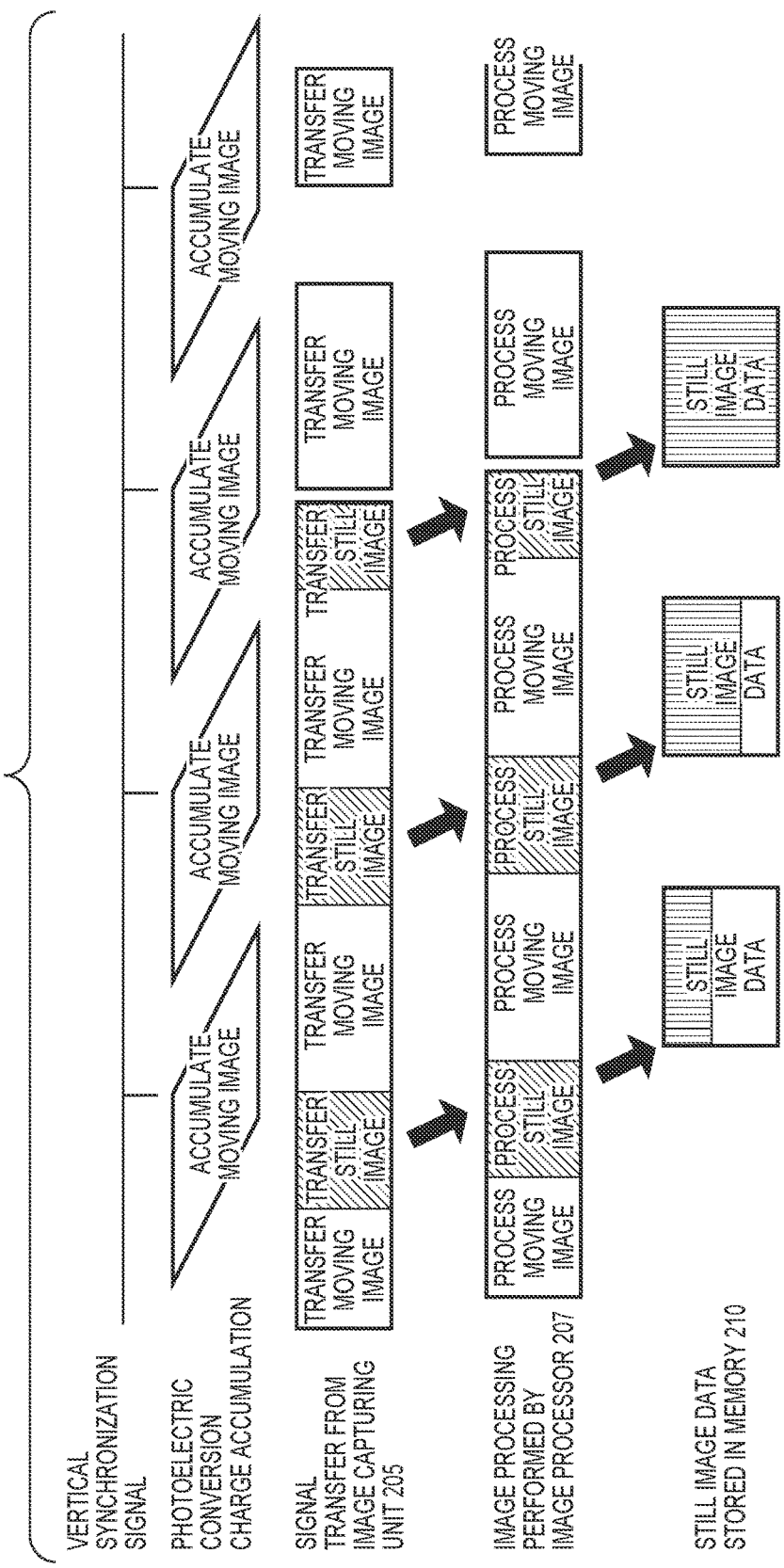
FIG. 9 is a timing chart of processing to transfer an image signal from the image capturing unit to an image processor during still image shooting while recording a moving image.

FIG. 9 shows an operation in which image signals for recording a still image that are stored in the frame memory 317 as a result of shooting a still image while recording a moving image are transferred during intervals (VBLK periods) in transfer of image signals for recording a moving image, subjected to image processing, and are stored in the memory 210. In the example in FIG. 9, the operation starts in a state where the image signals for recording a still image are already written in the frame memory 317 in the image sensor 300, and the time passes toward the right side in the diagram. The image signals for recording a still image stored in the frame memory 317 are divided to transfer data, so as to fill the intervals in transfer, within a fixed period, of the image signals for recording a moving image. The image processor 207 performs image processing corresponding to the type of image signals transferred from the image capturing unit 205, and the image signals for recording a still image after being subjected to image processing are written as still image data to the memory 210. After transfer of all image signals for recording a still image stored in the frame memory 317 in the image capturing unit 205 has ended, the normal moving image recording operation is continued.

Figure 10:
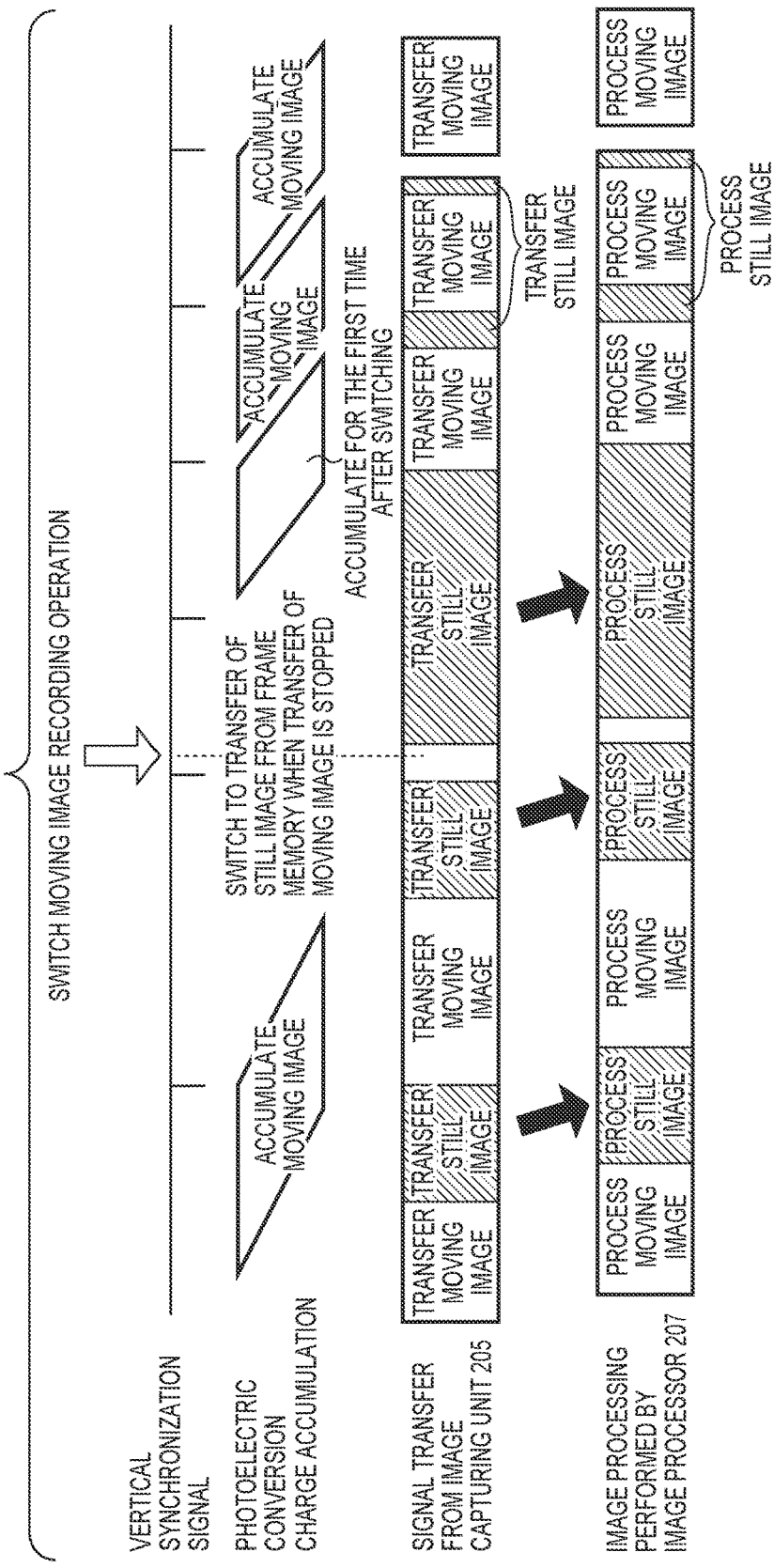
FIG. 10 is a timing chart of processing to transfer image signals from the image capturing unit to the image processor when a moving image recording operation is switched.

FIG. 10 shows an operation performed when the moving image recording operation is switched while the image signals for recording a still image are being transferred as shown in FIG. 9. When the recording of a moving image is temporarily stopped, and the operation is switched to recording of a new moving image with a different frame rate, transfer of the image signals for recording a moving image is temporarily stopped, while image signals for recording a still image are transferred. Thus, the image signals for recording a still image are transferred concurrently with the switching of the moving image recording operation.

As described above, according to the present embodiment, transfer of image signals for recording a still image stored in the frame memory 317 in the image capturing unit 205 and image processing for these image signals can be performed during intervals in transfer of image signals for recording a moving image in the operation to shoot a still image while recording a moving image. As a result, it is possible to avoid a situation where a still image cannot be shot while recording a moving image due to a shortage of the capacity of the frame memory 317 in the image capturing unit 205. Furthermore, the wait time for processing a still image after the recording of a moving image ends can be shortened or eliminated.

Second Embodiment

Next, the second embodiment will be described with reference to FIG. 11.

In the present embodiment, when an instruction to shoot a still image while recording a moving image is received, a mark indicating still image data is added to the latest image signals for recording a still image stored in the frame memory 317 in the image capturing unit 205. Some image signals, namely image signals obtained as a result of the signal transfer unit 318 thinning out the image signals stored in the frame memory 317 to record a moving image, are transferred to the image processor 207. When this data is transferred, data of some of the image signals for recording a still image to which the mark is added is transferred to the image processor 207 under a condition under which the transfer of the image signals for recording a moving image is not interrupted. Also, when this data is transferred, an identification signal for enabling the type of each image signal to be identified by the image processor 207 is added to the image signals.

Note that the configuration of the digital camera 100 and the image sensor 300 according to the present embodiment is the same as that shown in FIGS. 1 to 3 and 4A and 4B and described in the first embodiment, and a description thereof will be omitted accordingly. The operation of the system controller when shooting a still image while recording a moving image is also the same as the operation shown in FIG. 7 and described in the first embodiment.

Figure 11:
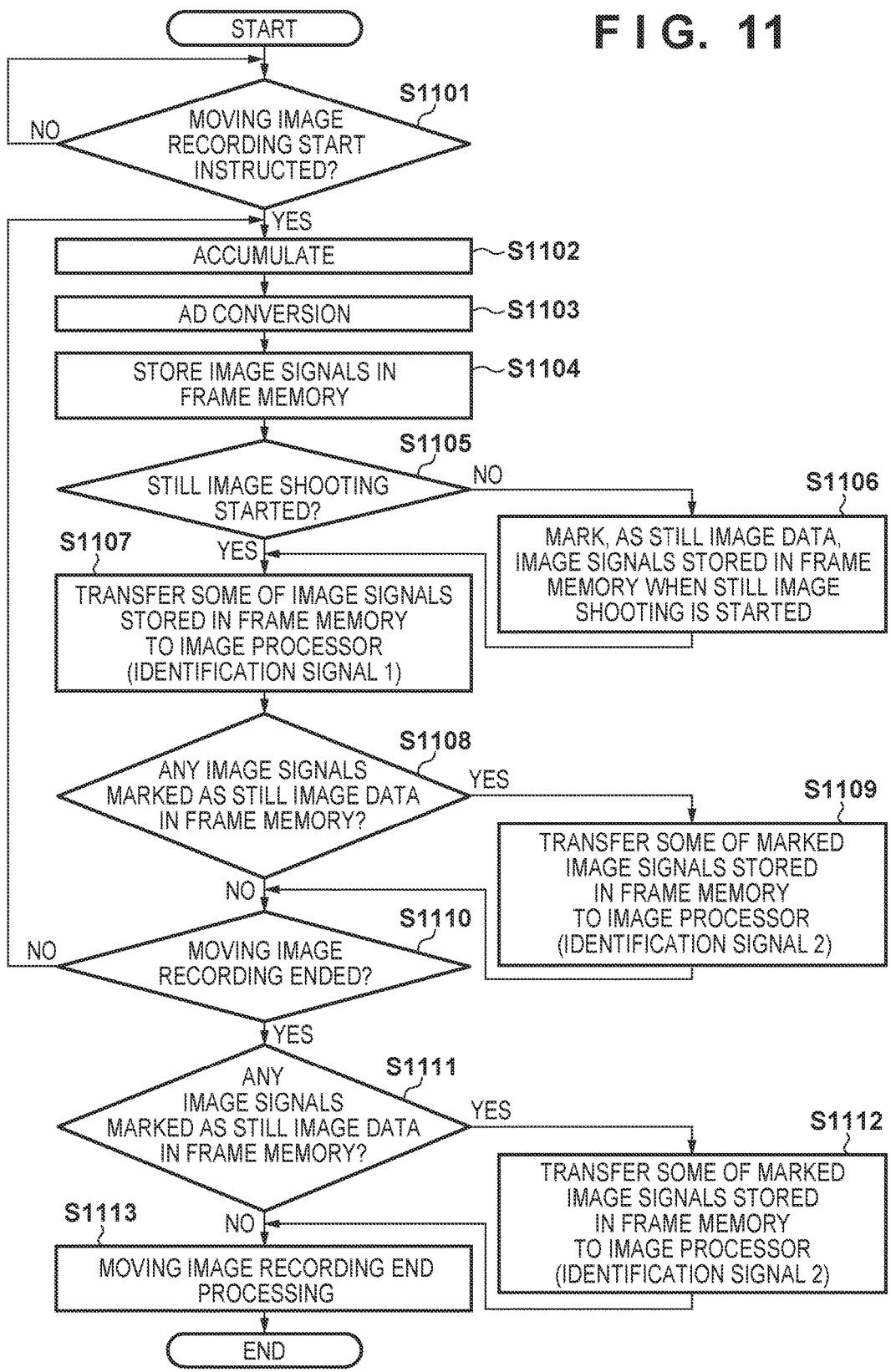
FIG. 11 is a flowchart of an operation of the image capturing unit during still image shooting while recording a moving image according to a second embodiment.

FIG. 11 shows an operation of the image capturing unit 205 performed during the operation to shoot a still image while recording a moving image by the digital camera 100 according to the second embodiment.

In step S1101, similar to step S601 in FIG. 6, if the image capturing unit 205 receives a moving image recording start signal from the system controller 201, the image capturing unit 205 starts the moving image recording operation.

In steps S1102 to S1104, the image capturing unit 205 performs the same processing as the processing in steps S606 to S608 in FIG. 6.

Specifically, in response to the moving image recording signal from the system controller 201, the image capturing unit 205 performs an accumulating operation to photoelectrically convert light received by the image sensor 300 (S1102), converts signal charges accumulated in step S1102 into digital signals by the ADCs 311 (S1103), and outputs the digital signals to the signal transfer unit 318 via the output switch 316. In step S1104, the image capturing unit 205 causes the signal transfer unit 318 to store, in the frame memory 317, the image signals for recording a still image output to the signal transfer unit 318.

In step S1105, similar to step S602, if the image capturing unit 205 receives a still image shooting start signal from the system controller 201, the image capturing unit 205 advances the processing to step S1106, and if not, the image capturing unit 205 advances the processing to step S1107.

In step S1106, in response to a control signal from the system controller 201, the image capturing unit 205 adds the mark indicating still image data to the latest image signals stored in the frame memory 317, and advances the processing to step S1107.

In step S1107, in response to a control signal from the system controller 201, the image capturing unit 205 transfers, to the image processor 207, some image signals, namely image signals obtained as a result of the signal transfer unit 318 thinning out the image signals for recording a still image stored in the frame memory 317 to record a moving image. Data is transferred in step S1107 frame-by-frame in a fixed period in accordance with the frame rate of the moving image that is being recorded. Depending on the specifications of the moving image recording function, the frame rate may change. Also, the period of performing the processing from step S1102 to S1104 configuration may be taken to coincide with the period of data transfer in step S1107. For example, there may be cases where the processing in steps S1102 to S1104 is performed at 120 fps, and data is transferred in step S1107 at 30 fps. In this case, similar to the addition of the mark indicating still image data to the image signals for recording a still image in step S1106, the image capturing unit 205 can add a mark indicating high-speed moving image data to all or some of the image signals stored in the frame memory 317. Alternatively, the image capturing unit 205 can add the mark indicating high-speed moving image data to image signals that are stored in the frame memory 317 during a fixed period after an instruction to start recording of a still image has been made by the system controller 201. Data is transferred from the image capturing unit 205 to the image processor 207 using a transmission technique such as LVDS (Low Voltage Differential Signaling). At this time, an identification signal for enabling the type of each image signal to be identified by the image processor 207 is added to the head of a data row, such as a synchronization code section in LVDS. For example, an identification signal 1 is added to each image signal for recording a moving image before the image signal is transferred.

In step S1108, in response to a control signal from the system controller 201, the image capturing unit 205 advances the processing to step S1109 if an image signal to which the mark indicating still image data is added exists in the frame memory 317, or advances the processing to step S1110 if it is determined that no such signal exists.

In step S1109, the image capturing unit 205 transfers, to the image processor 207, some of the image signals that are stored in the frame memory 317 and to which the mark is added, under a condition under which the transfer of the image signals for recording a moving image in step S1107 is not interrupted. Similar to step S610 in FIG. 6, the condition under which data transfer in step S1107 is not interrupted indicates a data volume with which data can be transferred during VBLK periods from when transfer of image signals corresponding to one frame of a moving image to the image processor 207 is finished until data transfer for the next frame starts. Some of the image signals having the mark stored in the frame memory 317 are transferred to the image processor 207 so as to satisfy this condition. In this case, as in step S1108, an identification signal for enabling the type of each image signal to be identified by the image processor 207 is added to the image signals. In the present embodiment, an identification signal 2 is added to each image signal for recording a still image before the image data is transferred. When image signals that have been marked as high-speed moving image data exist in the frame memory 317, some of the image signals to which the mark indicating the high-speed moving image data is added are transferred to the image processor 207, as in the case of the image signals to which the mark indicating still image data is added. In this case, an identification signal 3 is added to each image signal for recording a moving image at high speed before the image signal is transferred. After the processing in step S1109 ends, the processing returns to step S1102 and the moving image recording operation is continued.

In step S1110, similar to step S611, if the image capturing unit 205 receives a moving image recording end signal from the system controller 201, the image capturing unit 205 advances the processing to step S1111, and if not, the image capturing unit 205 returns the processing to step S1102 and continues the moving image recording operation.

In step S1111, similar to step S1108, if an image signal to which the mark indicating still image data is added exists in the frame memory 317, the image capturing unit 205 advances the processing to step S1112, and if not, the image capturing unit 205 advances the processing to step S1113 to end the moving image recording operation.

In step S1112, the image capturing unit 205 causes the signal transfer unit 318 to transfer, to the image processor 207, some of the image signals that are stored in the frame memory 317 and to which the mark is added, under a condition under which transfer of the image signals for recording a moving image in step S1109 is not interrupted. In step S1112, similar to step S1109, an identification signal for enabling the type of each image signal to be identified by the image processor 207 is added to the image signals. Note that after data transfer in step S1112 starts, the processing can be returned to step S1101 to start again the moving image recording operation. In the moving image recording operation that is to be started again, a change may be made to the data size, data thinning, pixel addition, the frame rate, or the like. The accumulating operation in step S1102 can be performed for the moving image recording operation that is started again while transferring data in step S1112, and data transfer in step S1112 is continued under a condition under which data transfer in step S1107 at the new frame rate is not interrupted.

As described above, according to the present embodiment, image signals for recording a still image can be transferred and subjected to image signal during intervals in transfer of image signals for recording a moving image stored in the frame memory 317 in an operation to shoot a still image while recording a moving image. As a result, it is possible to avoid a situation where a still image cannot be shot while recording a moving image due to a shortage of the capacity of the frame memory 317 in the image capturing unit 205. Furthermore, the wait time for processing a still image after the recording of a moving image ends can be shortened or eliminated.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-096362, filed May 12, 2016 which is hereby incorporated by reference herein in its entirety.

What is claimed is:

1. An image capturing apparatus comprising:
an image sensor including two-dimensionally arranged pixels each having a photoelectric conversion element which output first and second image signals and a signal storing unit which stores at least one frame of image signals that are output from the pixels;
an image processor which is provided outside of the image sensor and performs a predetermined image processing on the first and second image signals; and
a controller which controls
to transfer the first image signals from the image sensor to the image processor without storing in the signal storing unit of the image sensor, and controls to store the second image signals in the signal storing unit of the image sensor and transfer the second image signals stored in the signal storing unit of the image sensor to the image processor.

2. The apparatus according to claim 1, further comprising:
an information storing unit which stores information that is to be used by the image processor to perform the predetermined image processing on image signals.

3. The apparatus according to claim 2,
wherein the information storing unit has a plurality of areas in which information for performing a plural types of image processing on image signals is stored.

4. The apparatus according to claim 1, further comprising
a recording unit which records first image data generated as a result of the image processor performing image processing on the first image signals,
wherein, after processing to record the first image data ends, the controller continues transfer to the image processor until transfer of all second image signals stored in the signal storing unit of the image sensor is finished.

5. The apparatus according to claim 4,
wherein if transfer of the first image signals to the image processor is stopped, the controller starts to transfer of the second image signals stored in the signal storing unit of the image sensor to the image processor.

6. The apparatus according to claim 1,
wherein the first image signals are for recording a moving image, and
the second image signals are image signals for recording a still image.

7. The apparatus according to claim 6,
wherein a resolution of the first image signals are lower than a resolution of the second image signals.

8. The apparatus according to claim 1,
wherein the image sensor is configured by stacking a first semiconductor substrate on which the pixels are provided, on a second semiconductor substrate on which the signal storing unit is provided.

9. The apparatus according to claim 8,
wherein the second semiconductor substrate is also provided with a pixel driver which drives the pixels, and an AD conversion circuit which converts the image signals output from the pixels into digital signals.

10. The apparatus according to claim 1,
wherein a resolution of the first image signals are lower than a resolution of the second image signals.

11. The apparatus according to claim 1,
wherein the controller controls to transfer the second image signals stored in the signal storing unit of the image sensor to the image processor during an interval in transfer of the first image signals to the image processor.

12. A control method of an image capturing apparatus which has: an image sensor including two-dimensionally arranged pixels each having a photoelectric conversion element which output first and second image signals and a signal storing unit which stores at least one frame of image signals that are output from the pixels; and an image processor which is provided outside of the image sensor and performs image processing on the first and second image signals, the method comprising:
transferring the first image signals from the image sensor to the image processor without storing in the signal unit of the image sensor;
the second image signals from the image sensor in the signal storing unit of the image sensor and transferring the second image signals stored in the signal storing unit of the image sensor to the image processor.

\* \* \* \* \*